May 2, 1939.  J. J. MUCHER  2,156,459
MOLD
Filed June 25, 1936
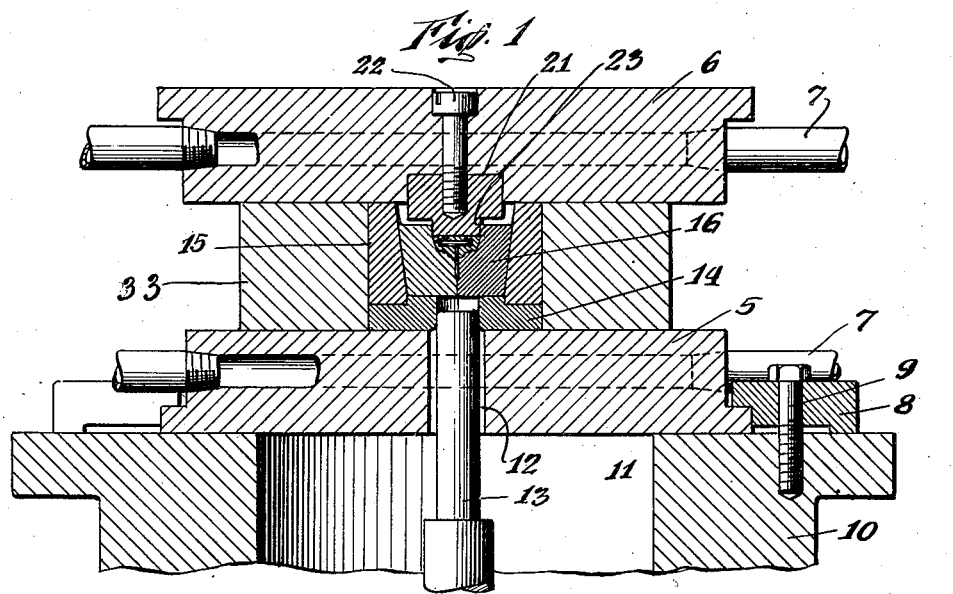
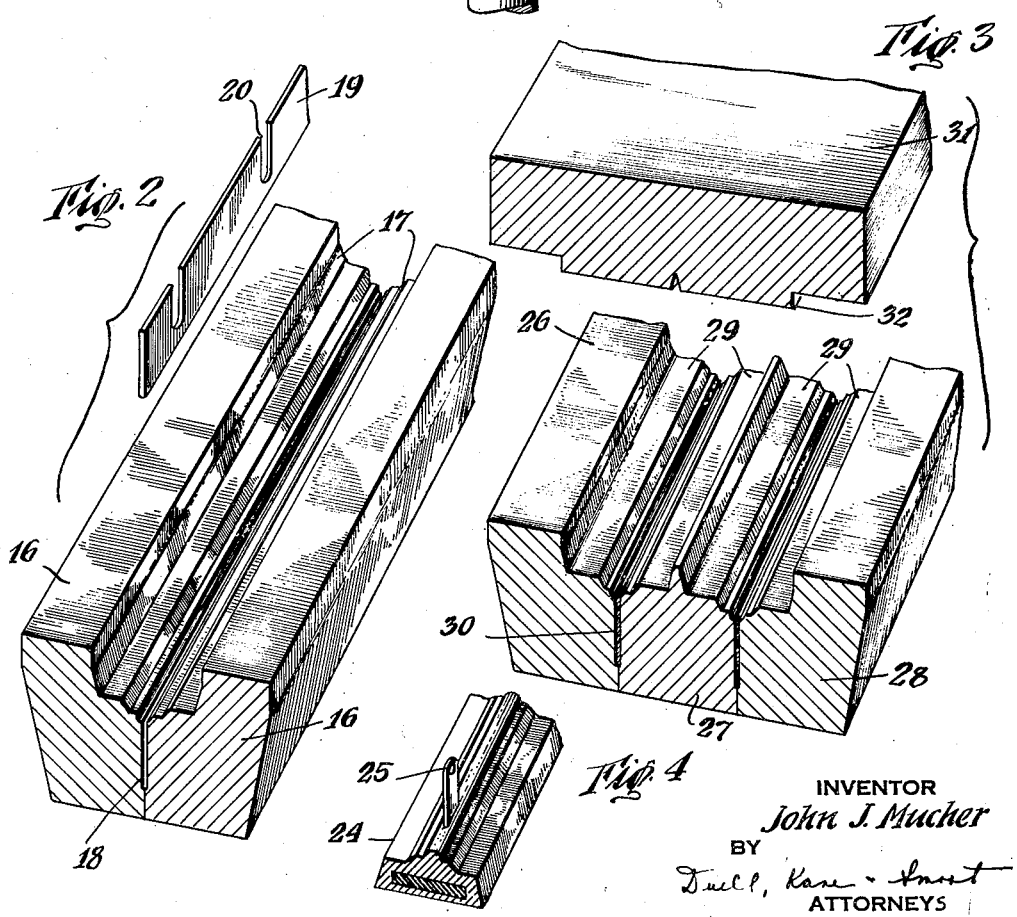
INVENTOR
John J. Mucher
BY
Duell, Kane - Amst
ATTORNEYS Patented May 2, 1939

2,156,459

UNITED STATES PATENT OFFICE 2,156,459

MOLD

John J. Mucher, Brooklyn, N. Y.

Application June 25, 1936, Serial No. 87,147

1 Claim. (Cl. 18—42)

This invention relates to a structurally and functionally improved mold, and in its more specific aspects aims to provide an apparatus of this character which may be employed for the forming of molded and die cast articles.

It is an object of the invention to furnish an apparatus of this character by means of which pins or similar expelling elements are eliminated. Accordingly, the formed article will not present upon any of its faces foreign and objectionable indentations or bosses. Additionally, the entire molding or die casting operation may be speeded up, in that it is not necessary for the operator to manipulate the knock-out pins or any equivalent elements to effect a release of the finished product from the mold after the molding or casting operation has been finished.

An additional object of the invention is that of providing a mold, the parts of which may readily be adapted for cooperation with power driven machinery as at present in existence. Moreover, the parts of the mold will be simple and individually rugged in construction and capable of being caused to properly cooperate, even if the operator does not possess even ordinary skill. Additionally, these parts will operate efficiently over long periods of time with freedom from difficulties.

With these and other objects in mind, reference is had to the attached sheet of drawings illustrating one practical embodiment of the invention, and in which:

Fig. 1 is a sectional side view of a portion of a press and showing a mold in association therewith.

Fig. 2 is a fragmentary perspective view of portions of the mold as indicated in Fig. 1;

Fig. 3 is a view similar to Fig. 2, but showing an alternative form of molding unit; and Fig. 4 is a perspective view of one form of article which may be produced by a mold constructed in accordance with the teachings of the present invention.

In the preceding statements and description of the invention as well as in the following specification and claim, the word "mold" has been used in its generic sense to designate a unit of apparatus capable of use, for example, with die cast metals as well as moldable material such as, for example, resins of the phenol formaldehyde type.

Accordingly, no specific interpretation is to be given this term, it being clearly understood that the sole limitations to the present apparatus are imposed, for example, where a material incapable of use in connection with the same is employed, or where an article is contemplated which employs a construction such that it would be incapable of being formed by means of molds constructed within the province of the appended claim.

With the foregoing in mind, attention is primarily invited to the drawing, in which it will be seen that the numeral 5 indicates a bed, and 6 a head. Each of these units may, if desired, be heated, as for example by having coupled thereto tubes 7 for the circulation of a hot fluid through channels forming a part of these units. The bed may be secured against movement with respect to a supporting base 10 by means of a suitable type of anchoring element 8, which may be bolted to the base as has been indicated at 9. The base may be hollow as at 11, and the bed 5 may be formed with an opening 12 through which a plunger 13, positioned within the cavity of the base, may be projected.

This apparatus is of more or less standard construction, and relative movement of the parts may be effected in any desired manner, as for example by having the base movable along the plunger and also with respect to the head; both of the latter elements being, for example, fixed against movement.

Positioned upon the bed is the molding unit or assembly, including, for example, as shown in Figs. 1 and 2, a plate 14, upon which sections 15 are mounted, and which enclose between them sections 16. The contacting surfaces of these several elements are machined or otherwise treated, so that a substantially perfect face to face contact occurs between all of them. As will be observed, the sections 15 provide in aggregate a tapered space or socket for the reception of sections 16. The latter provide in aggregate a wedge-shaped body. While this structure should be such that an intimate and proper contact of the abutting faces of sections 16 occurs when they are in the position shown in Fig. 1, the degree of taper should not be such that there is any danger of the sections 16 moving outwardly incident, for example, to internal pressure effected by an article in molding relationship therewith.

Such an article may be formed by, for example, having the upper faces of sections 16 recessed, as has been indicated at 17. The article might, moreover, include projecting portions provided preliminary to the treating or forming of the article in the mold. With a view to accommodating any such projections, either of the sections 16, or, as shown, both of the same, may provide a groove 18. To prevent the formation of fins, the removal of which would necessitate subsequent treatment of the article, the filler strip 19 may be disposed within the groove, and this filler strip may have notches 20 in its upper edge which are of a contour such that they would accommodate the projections of the article.

Cooperating with this structure and forming a part of the mold assembly is a plunger 21 which may be secured to the head by one or more bolts 22, and which is provided with a lower portion 23, the sides of which are adapted to slidably contact the extreme opposite faces of the surfaces 17 to thus mold or form an article under pressure and in the manner indicated in Fig. 1.

The specific configuration illustrated is provided with a view to permitting the formation of an article such as has, for example, been shown in Fig. 4. This article includes a body 24, formed of any desired material, and shaped within the mold and from which body a series of projections extend. This is intended merely to be illustrative and, as afore brought out, is not to be construed in a limiting sense, it being obvious that articles of numerous configurations may be produced, and that in such case the surfaces 17 may be modified as desired, and the groove 18 may be likewise modified or dispensed with, as desired.

Still having in mind the specific example under consideration, it might be desired to simultaneously provide a number of the same. In such event, sections 26, 27 and 28 would be provided, and the outer sections might, for example, be formed to furnish—when all the sections are assembled—a wedge-shaped body, functionally corresponding to the body of the mold specifically illustrated in Figs. 1 and 2. Again, great care should be taken in finishing the abutting surfaces of the parts so that a proper fit results. The operating surfaces may be contoured as at 29, and grooves 30 might extend therefrom. Obviously, in conjunction with a female member of this character, a plunger or head of the nature shown at 31 would be employed, which would have projecting parts 32 for cooperation with the surfaces 29.

In utilizing apparatus of this nature, and assuming the provision of mechanism as has been previously identified from numerals 5 to 13, inclusive, the mold part 21 is secured to the head 6, as, for example, by a bolt 22. The plate 14 is mounted upon the bed 5 and the sections 16 are mounted upon the raised portion of this plate, while the sections 15 are positioned upon the reduced edge portions thereof. This assembly is now enclosed by a confining element such as 33, it being, of course, appreciated that the latter might have been initially placed in position upon the bed and the parts thereupon disposed within its cavity. If an article such as has been illustrated in Fig. 4 is desired, the strip 19 is disposed in the groove 18 and the partially formed article is positioned within the molding recesses with the projecting portions 25 thereof disposed within the notches 20 of the filler strip. Of course, a sufficient quantity of moldable or formable material is also disposed within the recess and in proper position with respect to any elements which it is to enclose. The plunger 21 is now projected with reference to the block 16, and the article is formed or shaped with or without the aid of heat, as may be desired. Thereupon, if, for example, the base 10 moves away from the head 6, it is obvious that the plunger 21 of the mold will move out of the recess of the sections 16, and thereafter these sections will contact the plunger 13, which will cause them to move upwardly or be expelled from the space defined between the sections 16. As they reach a sufficiently elevated position, the sections 16 will normally separate, thus rendering accessible the article, and the entire operation may be repeated.

If a structure such as is shown in Fig. 3 is employed, it is obvious that the same procedure will be followed. In no event, however, is it necessary to employ pins or other expelling elements effecting delivery of the formed articles from the mold sections.

Accordingly, it will be apparent that, among others, the several objects of the invention, as specifically afore noted, are achieved. Obviously, numerous changes in construction and rearrangement of the parts might be resorted to without departing from the spirit of the invention as defined by the claims.

Having described my invention, what I claim as new and desire to secure by Letters Patent is:

In combination, a bed, a head projectible with respect thereto, a confining element positioned upon said head and presenting a longitudinally extending opening, the side walls of which project substantially vertically from said bed, a pair of sections arranged within said opening and having downwardly and inwardly inclined faces, a further pair of sections having outwardly and upwardly inclined outer faces in contact with the outer faces of said first named sections, said further sections being formed with recesses providing in aggregate a molding cavity, all of said sections presenting longitudinally extending portions, a longitudinally extending plunger affixed to said head and disposable within said cavity, a plate formed with an opening in line with the base of said further sections, said plate supporting all of said sections and being in turn supported upon said bed, means projectible through said plate opening and common to said further sections to engage the same and expel them from between said first named sections to simultaneously permit a separation of said further sections and release of an article disposed within said mold cavity, said projectible means being disposed substantially in line with the adjacent edges of said further sections, said further sections providing a parallel walled groove extending in line with and towards said projectible means, and a notched strip disposed within said groove with its notches extending in the direction of said molding cavity.

JOHN J. MUCHER.